United States Patent

[11] 3,614,452

| [72] | Inventor | Herman R. Felton |
| | | Wilmington, Del. |
| [21] | Appl. No. | 789,710 |
| [22] | Filed | Jan. 8, 1969 |
| [45] | Patented | Oct. 19, 1971 |
| [73] | Assignee | E. I. du Pont de Nemours and Company |
| | | Wilmington, Del. |

[54] SPLIT STREAM FLOW CELL FOR ANALYZING A FLUID
9 Claims, 7 Drawing Figs.

[52] U.S. Cl. .................................................. 250/218, 356/181
[51] Int. Cl. .......................................... G01n 21/26
[50] Field of Search .......................................... 250/218, 239; 356/246, 180–185; 210/31

[56] References Cited
UNITED STATES PATENTS

| 2,810,315 | 10/1957 | Miller | 250/218 X |
| 3,200,700 | 8/1965 | Topol | 250/218 X |
| 3,207,026 | 9/1965 | Churchill et al. | 250/218 X |
| 3,307,447 | 3/1967 | Carleton et al. | 250/218 X |

*Primary Examiner*—Walter Stolwein
*Attorney*—Herbert M. Wolfson

ABSTRACT: A method of analyzing a fluid, and an apparatus for accomplishing this, which comprises: splitting a stream of fluid into two substantially equal component streams; directing the flow of the component streams in opposite directions; passing a beam of light through substantially equal lengths of the two component stream in such manner that the beam traverses one component stream in a direction directly opposite to the direction of its flow and the other component stream in the direction of its flow; and monitoring the intensity of the emerging beam of light. The apparatus is a split stream flow cell for facilitating the above analysis process.

CHROMATO GRAPHIC RESOLVING APPARATUS

INVENTOR
HERMAN R. FELTON
BY *Herbert M. Wolfson*
ATTORNEY

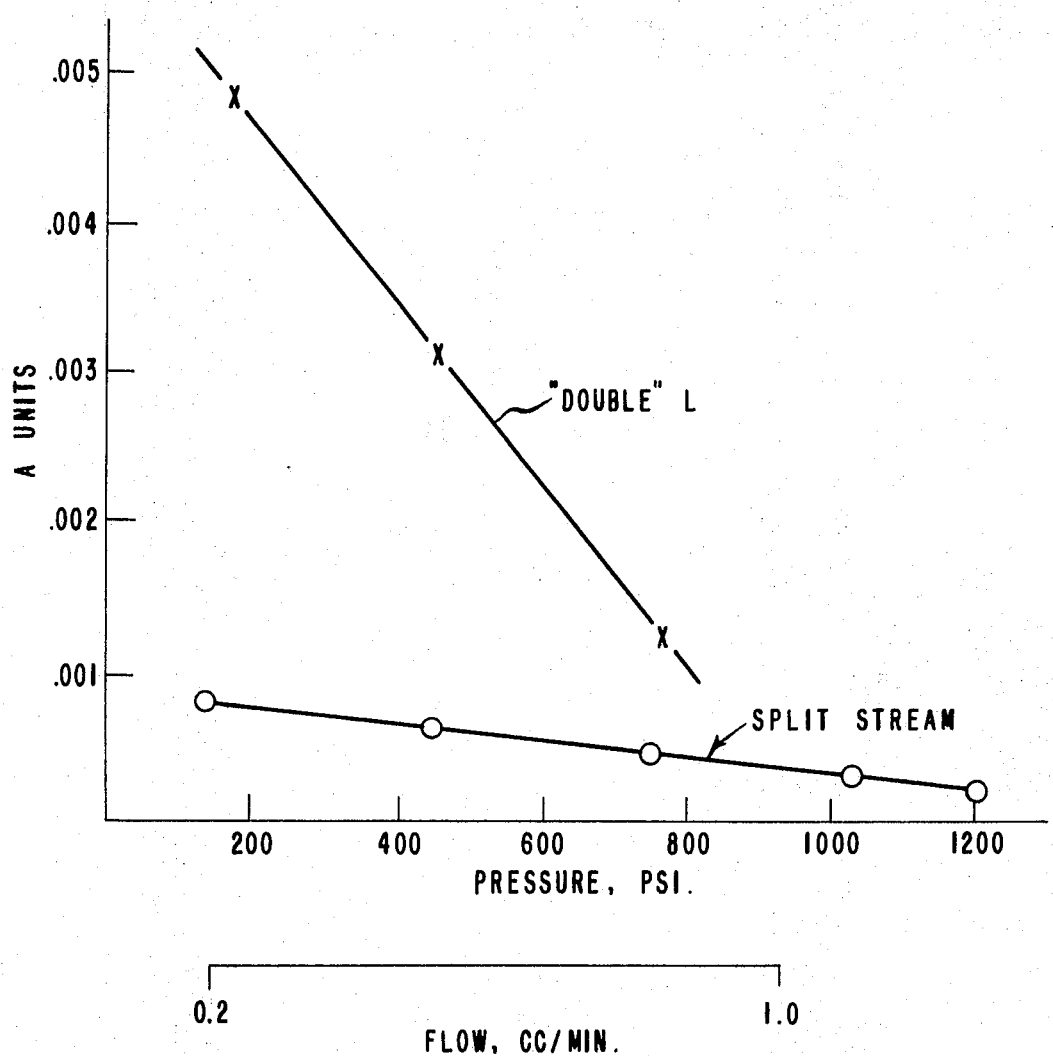

SPLIT STREAM FLOW CELL FOR ANALYZING A FLUID

BACKGROUND OF THE INVENTION

Analysis of the constituents of a fluid is often accomplished by photometric means. When the analysis is performed continuously on a stream of fluid, along which the composition change, there are problems in the analysis which are not present in the analysis of a static fluid. Liquid chromatography presents an example of such a situation. In liquid chromatography, as well as other fluid analysis, there are two criteria which must be satisfied to promote sensitivity in the analysis. First, the length of fluid through which the light beam passes must be maximized, and second, the volume of the sample cell must be kept to a minimum. Maximizing the length of the fluid cell maximizes the response of the photometer to changes in fluid composition. Minimizing the sample volume is necessary to insure resolution if the constituency of the fluid changes within a small region of the sample. To accomplish this the volume of the sample cell must be smaller than the volume of the region in which the change occurs, otherwise changes in the constituents could not be resolved from one another.

To maximize the cell length and maintain its volume at a minimum, the normal procedure is to have the fluid flow through a narrow channel with windows at both ends. The photometer consists of a radiation source, a sample cell to contain the flowing fluid, and a detecting means. The sample cell is designed so that the light beam from the radiation source passes through the flow channel in either the direction of flow of the fluid stream or in a direction opposite to the flow of the fluid stream. A variety of flow cells generally designed by their geometry, have been developed to facilitate such measurements. The U-flow cell, where the fluid enters the flow channel at one end, in a direction normal to the direction of flow through the channel, and exits at the opposite end of the channel on the same side of the channel as that on which it entered; and the "double" L-flow cell, similar to the U-flow cell except that the fluid exits on the opposite side of the channel from which it entered, are two examples of such cells. Another flow cell, the Z-flow cell is similar in design to the "double" L-flow cell except that the inlet and outlet to the flow channel are set at oblique angles to the flow channel so that the fluid entering the flow channel impinges on one of the windows forming an end of the flow channel.

In all of the above designs there is an anomaly in the measurement. The intensity of the transmitted light is flow dependent. Unless the flow is kept constant there are variations in the intensity of the transmitted light which are not due to changes in the composition of the fluid. This is particularly troublesome in liquid chromatography where the initial peak occurs within a short time after the flow begins, and where it generally takes hours before the last peak appears. It would be helpful if the flow rate could be increased towards the end of the analysis so that the measurement could be completed more rapidly, but if this were done, there would be a flow dependent variation in the intensity of the light which would hamper the analysis unless some compensation could be made. Various explanations of this anomaly have been set forth. Most of them are based on the theory that the anomaly is caused by turbulence in the fluid, but no one has been able to compensate for it by the design of the cell, based on this analysis.

SUMMARY OF THE INVENTION

The present invention is a new method of making photometric measurements on flowing fluids. It stems from a realization that the anomoly mentioned above is a flow phenomenon rather than a turbulence phenomenon. In this method, the fluid stream is split into two substantially equal component streams which are directed in opposite directions. The beam of light from the radiation source is then passed through equal lengths of each component stream in such manner that the beam traverses one component stream in a direction directly opposite to that of its direction of flow and the other component stream in the direction of its flow. The intensity is monitored with a photodetecting means, and since the beam of light passes through fluids flowing in both directions, the flow effects of both cancel one another. A split stream flow cell has been devised which will facilitate this method.

The operations and advantages of the cell of this invention and the measuring method will be apparent with reference to the following figures:

FIG. 7 is a plot of the baseline shift as a function of pressure head (or flow rate) for both the "double" L and the split stream flow cell illustrated in FIG. 1.

DISCUSSION OF DRAWINGS

Figure 1:
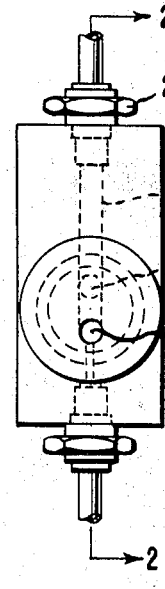
FIG. 1 is an end view of one possible embodiment of a split stream flow cell.
Figure 2:
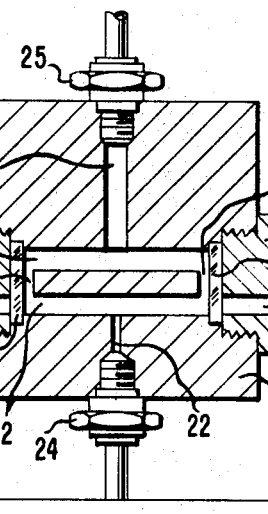
FIG. 2 is a front elevation in section along the line 2—2 in FIG. 1.

FIG. 1 and FIG. 2 are different views of a preferred embodiment of a split stream flow cell. In FIG. 2, a front elevation in section, a block of material 11, generally made from a metal such as brass or stainless steel, has two elongated flow channels, a lower flow channel 12, and an upper flow channel 13, cut into it. These channels can be of almost any cross section, but a tube of circular cross section will suffice and is the simplest to construct. The two channels are substantially parallel, and terminate at the ends of the block, or a short distance from them. The channels are long and narrow to increase the light path while maintaining the volume of the cell at a minimum. The dimensions will vary with the particular circumstances but one such cell which has been tested and shown to be effective has a volume of 8 microliters, a path light of 1 cm., and a cross-sectional diameter of 0.1 cm.

The two channels are separated by a short distance and connected at both ends by connecting channels 14 and 15. Two windows, 16 and 17, positioned at each end of the flow channels define a fluid chamber consisting of the two flow channels and the two connecting channels. In operation, the cell illustrated would be used in connection with a source of radiation and a photodetecting means. A beam of electromagnetic radiation from the radiation source passes through the sample cell and is detected by the photodetecting means.

In the discussion that follows the electromagnetic radiation used is a light beam, because this is the normal situation, especially in liquid chromatography. However, it is evident that radiation of varying frequency can be used as the needs of the analysis require. Furthermore, the present invention is not limited to liquid chromatography, or even to chromatography in general. It is intended to encompass all analysis systems wherein electromagnetic radiation is passed through a continuous stream of fluid. With this in mind, the windows can be made from any material, such as glass, quartz, or sapphire, which will permit the passage of the radiation used in the analysis.

Figure 3:
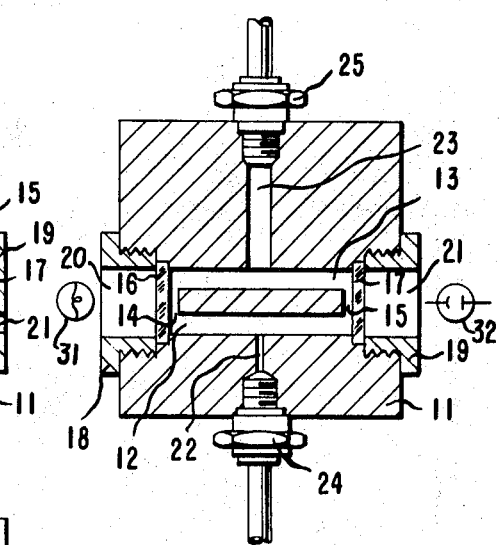
FIG. 3 is a front elevation in section of a second possible embodiment of a split stream flow cell including a photometer system.

The windows are held in place by end plugs 18 and 19, made from the same material as block 11, or from any suitable material. Since a seal is needed between the windows and the fluid chamber, gaskets (not shown) are used to seat the windows. Teflon fluorocarbon gaskets are suitable. End plugs 18 and 19 have sight channels 20 and 21 in them to provide a light path through the cell. In FIG. 2, these sight channels are in the form of holes drilled through the end plugs, aligned with the lower flow channel 12, and have a diameter approximately equal to that of the lower flow channel. As shown in FIG. 2, the path of the light is through the lower flow channel. This is a preferred configuration. The use of one flow channel as the optical cell maximizes the cell length while minimizing the cell volume. Using the bottom flow cell is preferred because this locates the optical path near inlet 22. In liquid chromatography, locating the optical path near the inlet, and therefore near the column, has the advantage of reducing the "dead" volume between the column and the optical cell. It is apparent however that the sight channels could have been aligned with the top flow channel, or as shown in FIG. 3, they could have been made large enough to include both flow channels. In some circumstances, these configurations may have some advantage, but in normal circumstances, the alignment shown in FIG. 2 is preferred. Also shown in FIG. 3 are a lamp 31 and a photodetector 32, which along with the flow cell comprise a photometer. Different regions in the spectrum of electromagnetic radiation will require different sources of radiation and detection means as well as the different windows mentioned above. For example a glower tube and thermocouple would be used, respectively, for the infrared.

Block 11 has two further channels in it; an inlet channel 22, and an outlet channel 23. Inlet channel 22 connects inlet coupling 24 to the lower flow channel. Normally, it is preferable to keep the length and diameter of inlet channel 22 as small as possible for the purpose, noted above, of keeping the "dead" volume to a minimum. The important aspect of this design, however, is the fact that inlet channel connects to the middle of the lower flow channel so that fluid entering the lower flow channel will divide into two component streams which flow in opposite directions in the lower flow channel and travel an equal distance to the end windows before they are diverted into the connecting channels. In this way, a light beam passing through the sight channels and the lower flow channel will pass through equal distances of fluid flowing in opposite directions relative to the light beam. Hence, any effects dependent on flow will cancel.

Figure 5:
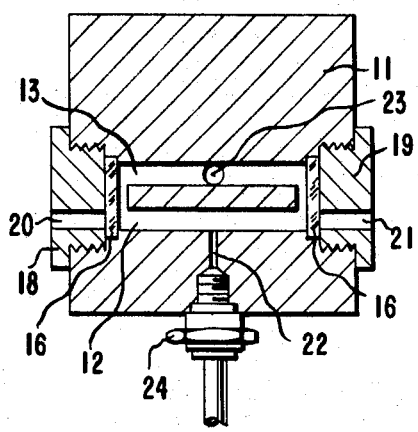
FIG. 5 is a front elevation in section along the line 5—5 of FIG. 4.
Figure 4:
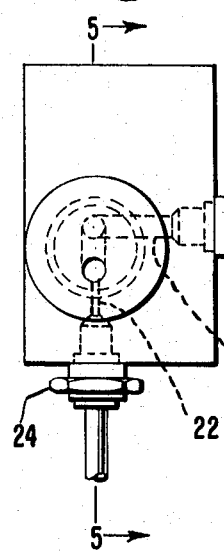
FIG. 4 is an end view of a third possible embodiment of a split stream flow cell.

In FIG. 2 outlet channel 23 is shown connecting outlet coupling 25 to the center of the upper flow channel. This configuration provides an equal semicircular path for each component of the initial stream and is preferred because of its simplicity and symmetry. With this configuration the desired canceling of flow effects will occur when the sight channel is aligned with the upper, lower, or both flow channels. The diameter and length of the outlet channel is not critical It can be directed in a direction opposite to that of the inlet channel as shown in FIG. 2 or it can be at an angle to the inlet channel as shown in FIG. 4 and 5.

Figure 6:
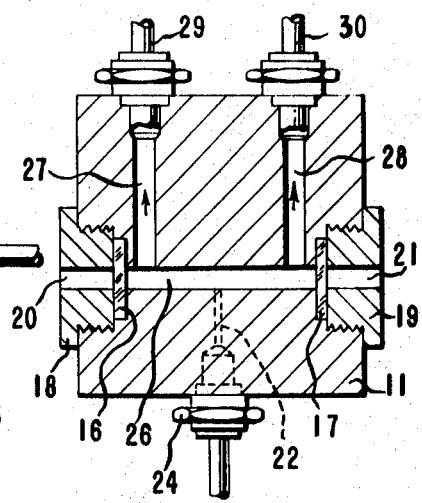
FIG. 6 is a front elevation in section of a fourth possible embodiment of a split stream flow cell.

Alternately, the upper flow channel and the connecting channels can be omitted, as shown in FIG. 6. This leaves a single flow channel 26, aligned with the sight channels 20 and 21. In this configuration the inlet channel still connects the center of the flow channel 26 to inlet coupling 24 in the manner described in reference to FIG. 2. In this configuration, however, there are two outlet channels 27 and 28 connecting each end of the flow channel to outlet couplings 29 and 30. Fluid flowing into the flow channel through inlet 22 will again split into two component streams of equal length, but in this configuration the component streams will not reconverge. Each component will leave the flow cell separately.

The effectiveness of the split stream flow cell in reducing the effects of flow on optical density measurements through a flow cell can be seen with reference to FIG. 7. In FIG. 7 the output of a photometer, in absolute units (A), as a function of fluid flow rate or pressure head for a "double" L and the split stream flow cell of FIG. 1 are compared. For simplicity the comparison is made with a reference fluid rather than a sample fluid. Hence it is the base line shift of the photometer as a function of flow that is illustrated. The results using a "-double" L configuration show a marked dependency on flow while the results using the split stream configuration are relatively insensitive to flow.

Photometer systems, including a standard flow cell, are well known to those skilled in the art. It is apparent that there are at least two possible ways to proceed with the analysis. In the first which is illustrated in and described above in reference to FIG. 3, a single flow cell is used and the output of the photometer is compared with a standard, or the difference in output over a period of time is measured. In the second, two flow cells are used, one for the sample and the other for a reference fluid, and the difference in transmission is measured. In the latter case two split stream flow cells of substantially the same design would be needed. The foregoing description and discussion are intended to be illustrative and not intended to limit the scope and/or use of the invention. Variations or departure apparent to those skilled in the art which conform to the spirit of the invention are intended to be included within the scope of the appended claims.

What is claimed is:

1. A fluid cell for optical analysis comprising:
   a. a body of material;
   b. an elongated flow channel formed in said body;
   c. an inlet channel formed in said body communicating with the center of said flow channel;
   d. two outlet channels formed in said body, one communicating with one end of said flow channel and the other communicating with the other end of said flow channel;
   e. two windows one of which being disposed at each end of said flow channel in such manner as to define an unobstructed fluid chamber between said windows and between said inlet and outlet channels whereby fluid flowing into said inlet channel will split into two substantially equal streams traversing said flow chamber in opposite directions towards different outlet channels;
   f. radiation means adjacent to one of said windows; and
   g. radiation sensitive means adjacent to the other of said windows.

2. A fluid cell for optical analysis comprising:
   a. a body of material;
   b. two substantially parallel elongated flow channels formed in said body;
   c. two connecting channels connecting said flow channels together at both of their ends;
   d. an inlet channel formed in said body communicating with the center of one of said flow channels;
   e. an outlet channel formed in said body communicating with the center of the other of said flow channels;
   f. two windows at each end of said flow channels in such manner as to define a fluid chamber consisting of the two flow channels and the two connecting channels, said fluid chamber being unobstructed between said windows and between said inlet and outlet channels, whereby fluid flowing into said inlet channel will split into two substantially equal streams each traversing a separate semicircular path around the fluid chamber and merging to flow out the outlet channel;
   g. radiation means adjacent to one of said windows; and
   h. radiation sensitive means adjacent to the other of said windows.

3. The fluid cell of claim 2 wherein said elongated flow channels are circular in cross section.

4. The fluid cell of claim 2 wherein said inlet channel has a volume substantially less than the volume of said outlet channels.

5. An apparatus for performing a chromatographic analysis upon a fluid which comprises the fluid cell of claim 2 and further comprises
   a. a chromatographic means for resolving said fluid into constituents
   b. the fluid cell of claim 2;
   c. a source of radiation adapted to pass a beam of radiation through said fluid cell; and
   d. a photodetecting means adapted to monitor the intensity of the radiation passing through said fluid cell, whereby changes in the composition of a fluid flowing through the fluid cell can be detected.

6. A method of performing a chromatographic analysis of a liquid which comprises:

a. passing said liquid through a resolving zone whereby said liquid is separated into a liquid stream of constituents;
b. dividing said liquid stream into two component streams;
c. directing the two component streams in such manner that they flow in opposite directions;
d. passing a beam of electromagnetic energy through substantially equal lengths of both component streams in a manner such that the beam traverses one component stream in a direction directly opposite to that of its flow and the other component stream in the direction of its flow;
e. monitoring the beam after it has passed through the liquid with a means responsive to the intensity of the beam; and
f. comparing with a standard, changes in the intensity of the beam.

7. The method of claim 6 wherein (a) said opposite directions in which said component streams are directed to flow are divergent and (b) said beam of electromagnetic radiation is passed through said streams while said streams flow in said opposite and divergent directions.

8. A method of performing a chromatographic analysis on a liquid from a sample source which comprises:
a. passing said liquid through a resolving zone whereby said liquid is separated into a liquid stream of constituents;
b. thereafter dividing said liquid stream from said sample source and a liquid stream from a reference source into two component streams each;
c. directing the component streams in such manner that component streams from the same source flow in opposite directions;
d. passing a separate beam of electromagnetic energy of the same frequency through substantially equal lengths of both component streams of each source in a manner such that each beam traverses one component stream of one source in a direction directly opposite to that of its flow and the other component stream of the same source in the direction of its flow;
e. monitoring each beam after it has passed through its respective liquid with means responsive to the intensity of each beam; and
f. comparing with a standard the difference in intensity between the beam which passes through the sample stream and the beam which passes through the reference stream.

9. The method of claim 7 wherein (a) said opposite directions in which said component streams from the same source are directed to flow are divergent and (b) said separate beam of electromagnetic radiation is passed through said streams of said source, while said streams from the same source flow in said opposite and divergent directions.

UNITED STATES PATENT OFFICE
CERTIFICATE OF CORRECTION

Patent No. 3,614,452          Dated October 19, 1971

Inventor(s) Herman R. Felton

It is certified that error appears in the above-identified patent and that said Letters Patent are hereby corrected as shown below:

Claim 5 should read:

--5. An apparatus for performing a chromatographic analysis upon a fluid which comprises the fluid cell of Claim 2 and further comprises a chromatographic means for resolving said fluid into constituents.--

Signed and sealed this 9th day of May 1972.

(SEAL)
Attest:

EDWARD M. FLETCHER, JR.          ROBERT GOTTSCHALK
Attesting Officer          Commissioner of Patents